United States Patent
Klapman et al.

(10) Patent No.: US 7,148,917 B2
(45) Date of Patent: Dec. 12, 2006

(54) METHOD AND APPARATUS FOR INDICATING A LOCATION OF A PERSON WITH RESPECT TO A VIDEO CAPTURING VOLUME OF A CAMERA

(75) Inventors: Matthew Klapman, Northbrook, IL (US); Michael D Kotzin, Buffalo Grove, IL (US)

(73) Assignee: Motorola Inc., Schaumburg, IL (US)

( * ) Notice: Subject to any disclaimer, the term of this patent is extended or adjusted under 35 U.S.C. 154(b) by 746 days.

(21) Appl. No.: 09/773,863

(22) Filed: Feb. 1, 2001

(65) Prior Publication Data

US 2002/0101512 A1 Aug. 1, 2002

(51) Int. Cl.
*H04N 5/232* (2006.01)

(52) U.S. Cl. .............. 348/211.12; 348/333.02; 348/14.16

(58) Field of Classification Search ............. 38/333.01, 38/333.02, 211.99, 211.1, 211.3, 211.4, 211.11–14, 38/14.01–16
See application file for complete search history.

(56) References Cited

U.S. PATENT DOCUMENTS

| | | | |
|---|---|---|---|
| 5,430,473 A | * | 7/1995 | Beecher et al. .......... 348/14.05 |
| 5,786,846 A | * | 7/1998 | Hiroaki .................... 348/14.16 |
| 5,999,207 A | * | 12/1999 | Rodriguez et al. ........ 348/14.03 |
| 6,038,257 A | * | 3/2000 | Brusewitz et al. ...... 375/240.21 |
| 6,282,206 B1 | * | 8/2001 | Hindus et al. .............. 370/468 |
| 2002/0118875 A1 | * | 8/2002 | Wilensky .................... 348/135 |

* cited by examiner

Primary Examiner—Vivek Srivastava
Assistant Examiner—Gevell Selby
(74) Attorney, Agent, or Firm—Hisashi D. Watanabe (57) ABSTRACT

A video processing system (100) employs a method and apparatus for indicating a location of a person (203) with respect to a video capturing volume (201) of a camera (101). A location determiner (115) receives at least one image from the camera (101), in which the image preferably includes at least a portion of the person (203). Based on the image, the location determiner (115) determines a location of the person (203) with respect to the video capturing volume (201) of the camera (101). An abstract representation generator (119) generates an abstract representation (209), e.g., an icon, of the person (203) and provides the abstract representation to a video processor (117). The video processor (117) positions the abstract representation (209) together with an image, e.g., of a remote call participant, to be displayed to the person such that the abstract representation indicates the location of the person with respect to the video capturing volume (201) of the camera (101), thereby providing processing and display efficient video feedback.

20 Claims, 4 Drawing Sheets

METHOD AND APPARATUS FOR INDICATING A LOCATION OF A PERSON WITH RESPECT TO A VIDEO CAPTURING VOLUME OF A CAMERA

FIELD OF THE INVENTION

The present invention relates generally to video processing systems and, in particular, to a method and apparatus for indicating a location of a person with respect to a video capturing volume of a camera to enable the person to position himself or herself within a desired location of the volume.

BACKGROUND OF THE INVENTION

Videophones and video conferencing equipment are known to include a video camera as part of the phone or equipment to enable parties engaging in a telephone call to not only hear each other, but to also see each other. Each end of an audiovisual call typically includes an audio transceiver, at least one monitor and at least one camera. The audio transceiver facilitates the exchange of voice communications, the monitors enable each party to see each other, and the cameras capture the scenes to be displayed on the monitors.

In order to insure that the person or persons on the receiving end of the transmission can see the person who is currently talking, automatic capturing or video feedback mechanisms are typically used. For example, video conferencing equipment typically includes voice-activated circuitry that controls the positioning of one or more cameras to locate and capture the picture of the person who is currently talking. Videophones do not typically include such automatic capturing capability, but instead provide video feedback to the speaker to enable the speaker to move himself or herself into the video capturing volume of the videophone camera. Such feedback typically consists of feeding the video captured by the speaker's own videophone camera to the speaker's own videophone display so that the speaker can see whether or not he or she is in the video capturing volume of the camera and, when in the video capturing volume, where he or she is positioned relative to the center of the capturing volume. Therefore, video feedback requires the videophone to process two video feeds, one from the remote call participant and another from the videophone's own camera. In addition, as mentioned to above, the use of video feedback also requires the image of the speaker to be shown on the local monitor or display. Such displaying of the speaker's image takes up valuable display area, reducing the amount of display area available to display the video feed from the remote participant(s). Such a reduction in display area is particularly prominent when only one display is used to display both the speaker for video feedback purposes and the remote participant(s), and is even more prominent when the single display is small and forms part of a handheld or portable communication device.

Therefore, a need exists for a method and apparatus for indicating a location of a person with respect to a video capturing volume of a camera that enable the person to position himself or herself within a desired location of the volume while minimizing the display area used to provide such an indication.

DETAILED DESCRIPTION OF A PREFERRED EMBODIMENT

Generally, the present invention encompasses a method and apparatus for indicating a location of a person with respect to a video capturing volume of a camera. A location determiner receives at least one image from a camera coupled to the location determiner. The image preferably includes at least a portion of the person, although, when the person is completely outside the video capturing volume of the camera, the image may not include any portion of the person. Based on the image, the location determiner determines a location of the person (e.g., a location of the person's head) with respect to the video capturing volume of the camera. An abstract representation generator generates an abstract representation (e.g., a graphical icon) of the person and provides the abstract representation to a video processor that is operably coupled to the location determiner. The video processor positions the abstract representation together with an image (e.g., of a remote call participant) to be displayed to the person, such that the abstract representation indicates the location of the person with respect to the video capturing volume of the camera. The location determiner, the abstract representation generator, and the video processor may be implemented in software as operating instructions stored in a computer-readable storage medium and/or may form part of a two-way communication device, such as a wireline or wireless videophone.

By providing video feedback through display of an abstract representation in this manner, the present invention enables a videophone user to obtain the minimum information necessary to properly position himself or herself within the video capturing volume of the videophone camera, while substantially reducing the display area and processing power required to provide such feedback as compared to prior art approaches. For example, use of a small graphics icon, such as a dot or other graphical representation of a human head, to represent a person's head provides the same information from the perspective of video feedback as displaying the person's head, without requiring the display area or video processing power necessary to display the person's entire head. In addition, use of a graphical or other abstract representation facilitates depiction of not only the person's current location, but also his or her relative location change over several video frames, his or her distance from or depth relative to the camera lens (e.g., through use of a varying diameter icon), and/or various other location-related information, such as directional information (e.g., an arrow) to instruct the person in which direction to move to be positioned in the center of the camera's video capturing volume.

Figure 1:
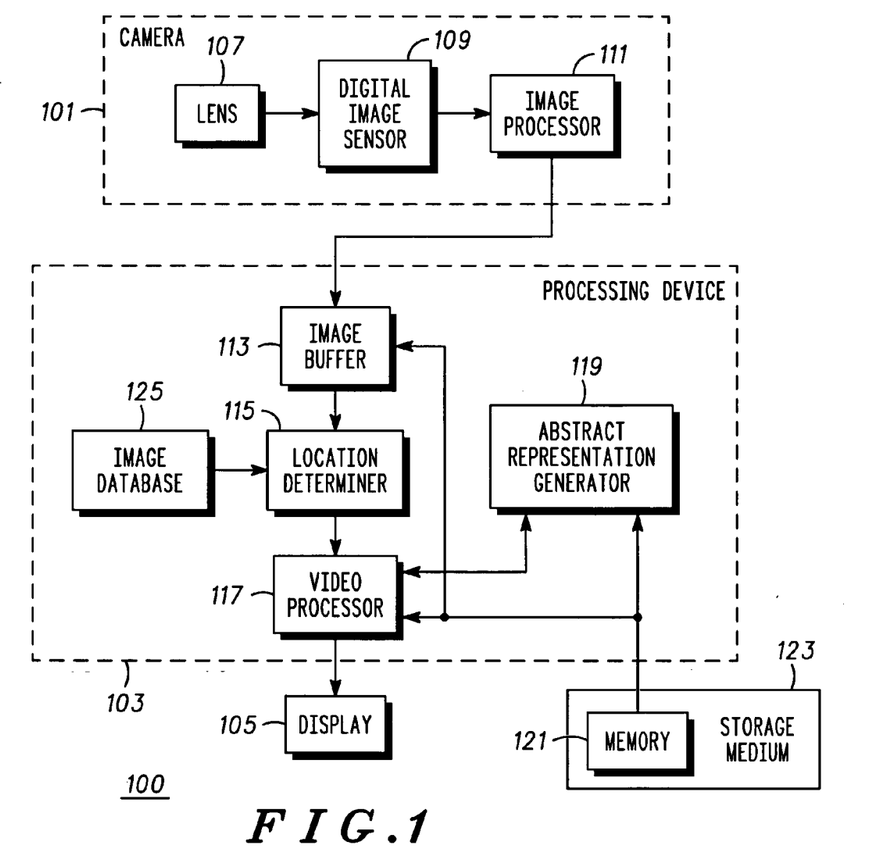
FIG. 1 is a block diagram of a video processing system in accordance with the present invention.

The present invention can be more fully understood with reference to FIGS. 1–7, in which like reference numerals designate like items. FIG. 1 is a block diagram of a video processing system 100 in accordance with the present invention. The video processing system 100 includes a camera 101, a processing device 103 and a display 105. The camera 101 is preferably a digital video recorder and includes a lens 107, a digital image sensor 109, and an image processor 111. The digital image sensor 109 and the image processor 111 are preferably embodied in a digital imaging sensor integrated circuit (IC), such as the M64285FP or the M64287U complementary metal oxide semiconductor (CMOS) imaging sensor that is commercially available from Mitsubishi Electric and Electronics USA, Inc., Electronic Device Group of Sunnyvale, Calif. Alternatively, the digital image sensor 109 and the image processor 111 may be implemented in separates ICs. For example, the digital image sensor 109 may be a charge coupled device (CCD) and the image processor may be a digital signal processor (DSP) or application specific integrated circuit (ASIC) that performs feature extraction and image recognition based on the output of the image sensor 109. In such an alternative embodiment, the image processor 111 may form part of the processing device 103. In yet another embodiment, the camera 101 may be an analog video recorder, in which case the image sensing and processing may take place in the analog domain and the image processor 111 would include an analog-to-digital (A/D) converter to convert the analog processed video signal into the digital domain for use by the processing device 103. Still further, the camera 101 may be an analog video recorder with an integrated A/D and digital image processing.

The processing device 103 preferably includes one or more microprocessors, microcontrollers, DSPs, ASICs, and/or other processing devices. Functionally, the processing device 103 includes an image buffer 113, a location determiner 115, a video processor 117, and an abstract representation generator 119. The image buffer 113 preferably comprises a first in, first out (FIFO) memory buffer or a two-dimensional random access array memory buffer that can store full or reduced scale image data for multiple frames as needed by the location determiner 115. The location determiner 115 is preferably implemented in software or firmware stored in system memory 121 and, when executed by the processing device 103, computes the location of the video center of mass of one or more persons and/or objects captured in an image by the camera 101 with respect to the viewing volume of the camera 101.

The video processor 117 is preferably implemented in an ASIC that functions to produce pixel data for the display 105 in accordance with operating instructions stored in system memory 121 or in a local memory of the video processor 117. The video processor 117 includes one or more frame buffers (not shown) to store graphics data received from the abstract representation generator 119 and other graphics and/or video information to be displayed in an image on the display 105. Each frame buffer stores an amount of pixel data to display at least one frame of video and/or graphics on the display 105. The size of each frame buffer is selected based on the maximum size and resolution of the display 105. Multiple frame buffers or a frame buffer with multiple sections may be used to implement frame flipping operations in accordance with known techniques to provide icon animation as described in more detail below.

The abstract representation generator 119 preferably includes a known graphics processor or two-dimensional graphics engine that generates one or more graphics icons in predetermined geometric shapes, such as a circle, a square or a triangle, in response to signaling from the video processor 117. Although depicted separately, the abstract representation generator 119 may be implemented as an element of the video processor 117.

In an alternative embodiment, the abstract representation generator 119 may produce audio representations of the location of the person with respect to the video capturing volume of the camera 101, together with or instead of graphical representations. For example, the abstract representation generator 119 may include pre-stored audio clips, tones, and/or beeps that are selected under the control of the video processor 117 and inform the user of the system 100 as to his or her actual location within the video capturing volume of the camera 101, as to his or her relative location with respect to a preferred location within the video capturing volume of the camera 101, as to his or her relative location with respect to an edge of the video capturing volume of the camera 101, or that he or she is entirely outside the video capturing volume of the camera 101.

The display device 105 may be any conventional cathode ray tube (CRT) display, liquid crystal display (LCD), or other display. In addition, when audio representations are provided or permitted, the display device 105 preferably also includes an audio display device, such as one or more speakers. Although depicted as separate elements in FIG. 1, the camera 101, the processing device 103, and the display 105 may be integrated into a single video processing apparatus, such as a videophone or other two-way communication device.

The video processing system 100 may also include various digital storage media, such as random access memory (RAM), read only memory (ROM), a floppy disk, a compact disk read only memory (CD-ROM), a hard disk drive, a digital versatile disk (DVD), a flash memory card or any other medium for storing digital information. In a preferred embodiment, at least one such digital storage medium 123 includes memory 121 to store operating instructions that, when executed, cause the processing device 103 to perform at least the functions of the location determiner 115, the video processor 117, and the abstract representation generator 119. For example, when the camera 101 is a digital camera with integrated image processing or an analog camera with an integrated A/D and image processing, the processing device 103 may be implemented as one or more processing devices executing stored operating instructions to perform the functions of the image buffer 1113, the location determiner 115, the video processor 117, and the abstract representation generator 119. As discussed above, each such processing device may be a microprocessor, a microcontroller, a DSP, a state machine, logic circuitry, or any other device that processes information based on operational or programming instructions. One of ordinary skill in the art will recognize that when the processing device 103 has one or more of its functions performed by a state machine or logic circuitry, the memory containing the corresponding operational instructions may be embedded within the state machine or logic circuitry. The operations performed by the processing device 103 and the rest of the video processing system 100 are described in detail below.

The video processing system 100 or portions thereof may be incorporated into any single or multiple microprocessor or microcontroller-based communication device, including, but not limited to, a laptop computer, a palmtop computer, a personal computer, a workstation, a personal digital assistant (PDA), a set top box, a wireless communication device (e.g., a two-way radio, a radiotelephone, a graphics-capable pager, or a wireless data terminal), a landline telephone, a videophone (in which case, the camera 101 would be incorporated as part of the telephone), or any other suitable device or devices that execute one or more software and/or firmware applications and/or include appropriate hardware to at least process incoming video data from a local source, and generate and display graphics data and/or synthesized audio based on the incoming video data. As described below with respect to FIGS. 3 and 4, the video processing system 100 is preferably incorporated into a two-way communication device, such as a handheld videophone.

Figure 2:
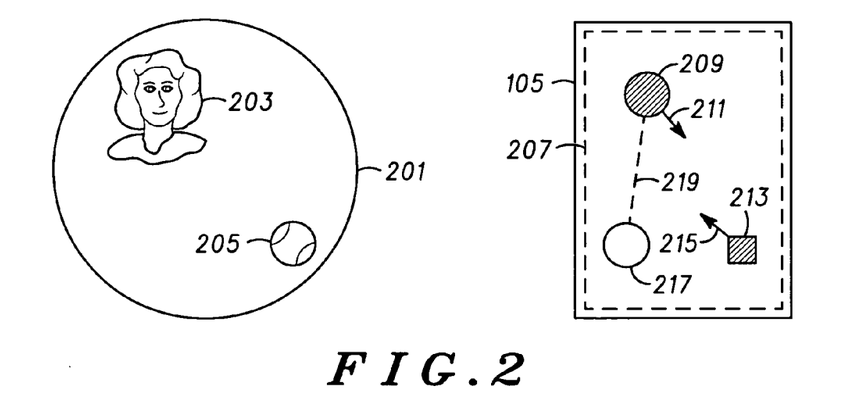
FIG. 2 illustrates a video capturing volume of a camera of the video processing system of FIG. 1 and corresponding abstract representations presented on a display by the video processing system of FIG. 1.

Operation of the video processing system 100 in accordance with a particular embodiment of the present invention can be more fully understood with reference to FIGS. 1 and 2. During operation of the system 100, the camera lens 107 captures two-dimensional images of persons and objects located within the camera's video capturing volume 201 (e.g., as projections of a three-dimensional environment onto a planar array). The camera's video capturing volume 201 may be adjusted by varying the focal length of the lens 107 as is known in the art. The exemplary video capturing volume 201 depicted in FIG. 2 contains an image that includes a user 203 of the video processing system 100 and an object 205 (e.g., a ball). Of course, other persons and objects may also be in the image captured by the camera lens 107. The image captured by the camera lens 107 is processed into a digital image by the digital image sensor 109 and the image processor 111 using known optical processing techniques.

The processed digital image is stored in the image buffer 113 and retrieved by the location determiner 115. Upon receiving or retrieving the stored image, the location determiner 115 detects the location of the video center of mass of each person 203 and/or object 205 in the image using known image sensing techniques. In addition, the location determiner 115 computes the location of each person 203 and/or object 205 in the video capturing volume 201 by comparing two or more successive video frames and, using known edge detection and visual optic flow techniques, calculating a location of the video center of mass for each frame, comparing the calculated center of mass locations (x, y coordinates) within the image frames to determine vertical (up or down) translation between frames, and averaging radius changes to determine an estimated difference from the camera 101 to the person 203 and/or the object 205.

When computing the location of each person 203, the location determiner 115 may locate multiple portions of the person 203. For example, the location determiner 115 may locate the person's head and hand. In the preferred embodiment, the location determiner only determines the location of the person's head. The location determiner 115 may be further limited (e.g., via software) to compute the location of a threshold number of persons and/or objects so as to insure that display of the representations of the persons and/or objects is not unduly confusing and/or does not occupy an undesired amount of display screen area. The location determiner 115 provides the computed locations to the video processor 117 or alternatively stores the computed locations in a local memory or in other memory 121 accessible by the video processor 117.

Upon obtaining the location or locations of each person 203 and/or object 205 from the location determiner 115 either directly or indirectly (e.g., by reading the location(s) from memory), the video processor 117 instructs the abstract representation generator 119 to generate an abstract representation for each person 203 and/or object 205. In the preferred embodiment, the abstract representation generator 119 generates an icon 209, 215 to represent each person 203 and/or object 205. The icon may be any shape, but is preferably a basic geometric shape, such as a circle, square, or triangle. Different icons may be used to identify persons and objects. For example, as depicted in FIG. 2, a circle icon 209 may be used to indicate a person or a person's head; whereas, a square icon 213 may be used to indicate an object. Regardless of the particular shape of the selected icon 209, 213, the icon 209, 213 occupies substantially less area in the displayed image 207 than would the entire image of the person 203 or object 205 if the entire image of the person 203 or object 205 was displayed in the displayed image 207.

In an alternative embodiment, the iconic representations may be generated and stored in advance, such that the video processor 117 need only retrieve the desired icon or icons 209, 213 from the abstract representation generator 119. In such an embodiment, the abstract representation generator 119 may include an icon or equivalent representation buffer that is accessible by the video processor 117 to store the pre-generated icons or representations.

After receiving the location of the person 203 and/or object from the location determiner 115 and the corresponding representations 209, 213 from the abstract representation generator 119, the video processor 117 displays an image 207 on the display 105 that includes the representations 209, 213 and other information (e.g., video or other graphics) intended to be viewed by the system user. The abstract representations 209, 213 are displayed in such a manner as to indicate the location of the person 203 and/or object 205 with respect to the video capturing volume 201 of the camera 101. Thus, the video processor 117 positions each abstract representation 209, 213 onto the display screen 105 such that each abstract representation indicates the location of the person 203 and/or object 205 with respect to the video capturing volume 201 of the camera 101. For example, as depicted in FIG. 2, the person's head 203 (e.g., the head of the user of the video processing system 100) is located in the upper left portion of the video capturing volume 201 of the camera 101 and the object 205 is located in the lower right portion of the video capturing volume 201 of the camera 101. Accordingly, the video processor 117 positions the icon 209 representing the person's head 203 in the upper left portion of the image 207 displayed on the display screen 105 and positions the icon 213 representing the object 205 in the lower right portion of the image 207 displayed on the display screen 105. With such positioning, the system user can quickly determine where he or she and/or the object 205 is located with respect to the video capturing volume of the camera 101.

The icons or other abstract representations may be used not only to indicate the current position of a person or object within the video capturing volume 201 of the camera 101 (i.e., the position of the person or object in the most recent video frame or group of video frames captured and processed by the camera 101), but may also be used to indicate the depth of the person or object in the captured image (e.g., how close the person or object is to the camera lens 107) or the relative location change of the person or object over several captured video frames. For example, known image processing techniques may be used to detect the edges or outline of a person's head 203 (or other portion of a person) or an object 205 captured in a video frame by the camera 101. Based on the outline, the location determiner 115 may determine the area of the captured head 203 or object 205 and instruct the abstract representation generator 119 to create an icon or other abstract representation corresponding to the determined area. The larger the area, the closer from a depth perspective the person or object is to the camera lens 107. Accordingly, by varying the area or size of the icon 209, 213, the video processor 117 can indicate the depth of the person or object in the video capturing volume 201 of the camera 101. The size of the icon 209, 213 may also correspond to the size of the part of the person or the object being represented, provided that the size of the icon 209, 213 or other representation is substantially smaller than the size of the entire image of the part of the person 203 or the object 205 had such entire image been displayed.

Alternatively, or in addition, the video processor 117 may display the abstract representation to depict the relative location change of the person or object over several captured video frames. For example, the video processor 117 may store (e.g., in local processing device memory or system memory 121) the positions and/or sizes of the icons generated over several video frames and display the icons in such a way as to indicate the change of location over time. For instance, if the user of the system 100 is sitting down, resulting in the generation and display of an icon 217 in the lower left corner of the displayed image 207, and then stands up, resulting in the generation and display of the icon 209 in the upper left corner of the displayed image 207, the video processor 117 may indicate such translation of position by displaying the original icon 217 (e.g., in outline only) in the first position and the subsequent icon 209 in the most recent position to indicate the path 219 traveled by the person's head 203 or object 205. Alternatively, the video processing system 100 may include a frame buffer arranged into multiple memory sections to facilitate animation of the change in position or depth of the person or object. In this case, when the video processor 117 detects a change in location of a person or object as indicated by the location output by the location determiner 115, the video processor 117 might utilize known techniques to animate the icon 209 to depict the change in location.

More detailed image processing may also be used to detect the rotation of the person (e.g., person's head) or the object. For example, rotation may be extracted by detecting the angular change of a non-symmetrical video shape using known optical flow techniques and methods.

As used herein, the term "location" as it relates to a person, a part of a person (e.g., head 203), or an object 205 captured in the video capturing volume 201 of the camera 101 is intended to be broadly interpreted to mean the actual location (e.g., position and/or depth) of the element (object, person, or part of a person) with respect to a current captured video frame or the relative location change (e.g., translation and/or rotation) over multiple captured video frames. In a preferred embodiment, the location determiner 115 determines locations of captured elements for each captured video frame. Alternatively, the location determiner 115 might only determine new locations periodically (e.g., every second or every fifteen captured video frames).

In addition to indicating location, the video processor 117 may also display an indication 211, 215 to the system user as to which direction the user should move himself or herself, or an object 205 to be more centrally located within the video capturing volume 201 of the camera 101. The indication 211, 215 may form part of the abstract representation (e.g., icon) or may be a separate graphic element generated by the abstract representation generator 119 or the video processor 117. Alternatively, a rectangle or other geometric shape (e.g., circle, oval or polygon) may be displayed to illustrate the camera's video capturing volume. The abstract representation of the person 203 and/or object 205 may then be displayed within the video capture rectangle to illustrate the person's or object's actual location within the video capturing volume, thereby providing feedback to aid the user in his or her attempt to remain, or keep an object 205 maintained, in the center of the camera's video capturing volume.

When the video processing system 100 is being used primarily to inform the 5 user of the system 100 as to his or her location with respect to the video capturing volume 201 of the camera 101 (which would typically be the case for two-way audiovisual communications), the location determiner 109 preferably compares the processed image received from the image processor 111 to images in an image database 125 (e.g., contained in processing device local memory or in system memory 121) to determine whether the processed image includes the image of a person's head, thereby indicating that the person's head is within the video capturing volume 201 of the camera 101. For example, the location determiner 109 might perform mathematical correlations to determine whether any portion of the processed image correlates well with pre-stored data representative of the features of a person's head. When the location determiner 109 determines that the processed image includes a person's head, the person's head is within the video capturing volume 201 of the camera 101 and the location determiner 109 provides the location of the person's head to the video processor 111 as described above. However, if the location determiner 109 does not detect the presence of a person's head within the video capturing volume 20 201, the location determiner 109 either does not provide any position to the video processor 111 or provides in indication (e.g., sets a flag) to the video processor 111 to indicate that no head is present.

Upon detecting that a person's head is not present, the video processor 111 indicates this condition to the system user 203 either indirectly (e.g., by not displaying an icon 209 to the user) or directly (e.g., by displaying a blinking icon 209 to the user). Thus, when the user views the displayed image 207, the user can quickly detect whether he or she is outside the video capturing volume 201 of the camera 101 by the absence of an icon 209 or by the presence of some other indication (e.g., a blinking icon 209).

As briefly mentioned above, the video processing system 100 may form part of a two-way communication device, such as a laptop computer, a palmtop computer, a personal computer, a workstation, a PDA, a set top box, a wireless communication device (e.g., a two-way radio, a radiotelephone, a graphics-capable pager, or a wireless data terminal), a landline telephone, or a videophone. Such a two-way communication device 300 that includes a video processing system similar to the system 100 described above is illustrated in block diagram form in FIG. 3. Similar to the video processing system 100 of FIG. 1, the two-way communication device 300 includes a camera 301, a processing device 303, a display 309, and system memory 325. In contrast to the video processing system 100 of FIG. 1, the communication device 300 of FIG. 3 further includes a transmitter 305, a receiver 307, and a video encoder/decoder (codec) 308. Camera 301 is substantially identical to the camera 101 of FIG. 1 and includes a lens 311, a digital image sensor 313, and an image processor 315. As discussed above, depending on implementation, the image processor 315 may form part of the processing device 303.

Processing device 303 is substantially similar to processing device 103 and includes an image buffer 317, a location determiner 319, a video processor 321, and an abstract representation generator 323. The primary difference between the processing device 303 of FIG. 3 and the processing device 301 of FIG. 1 is in the operation of the video processor 321. In the two-way communication device 300, the video processor 321 receives both the representation (e.g., icon) generated by the abstract representation generator 323 and video images from a remote two-way communication device. The remote communication device may be located at any distance away from the communication device 300, but is typically located a substantial distance away (i.e., far enough that the users of the two communication devices would not just immediately communicate in person). The video processor 321 overlays the icon(s) or other representation(s) on top of the stream of video images received from the remote device. Therefore, when embodied in a two-way communication device 300, the video processor 321 preferably includes a frame buffer that stores pixel data for both the video data received from remote source and the graphic data received from the abstract representation generator 323. In addition, the video processor 321 also preferably includes a display overlay engine (not shown) to overlay the graphic icon(s) with the video images received from the remote device.

Figure 3:
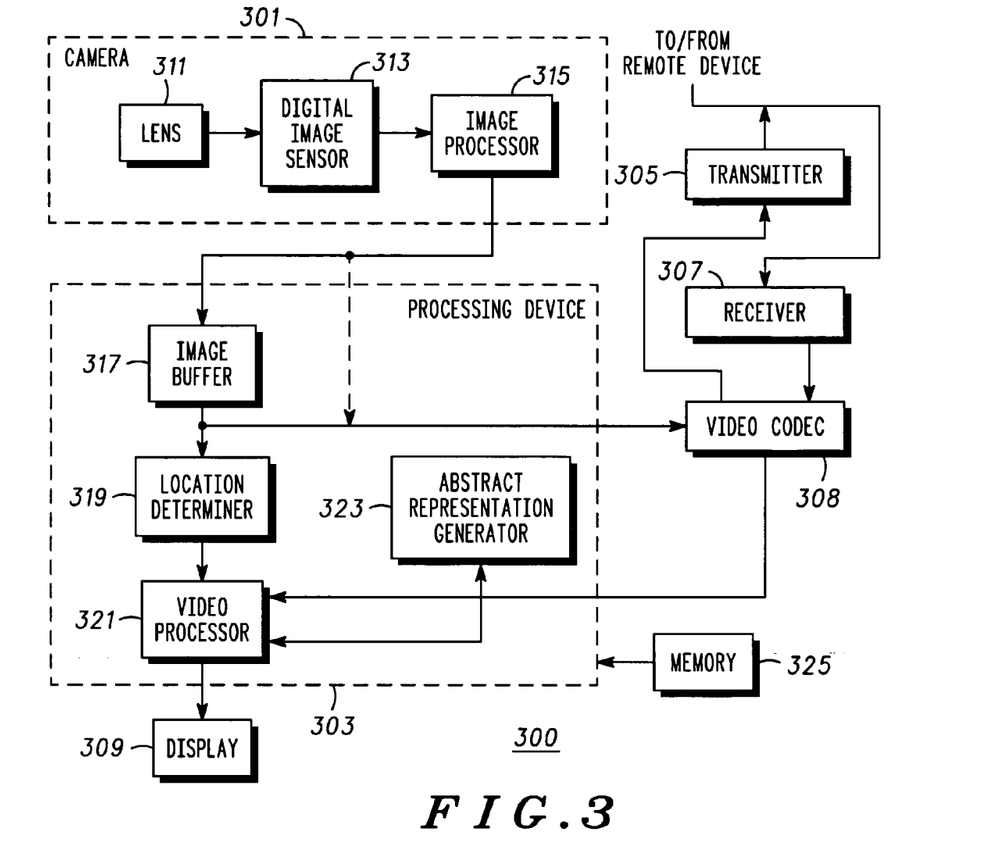
FIG. 3 is a block diagram of a two-way communication device in accordance with the present invention.

The transmitter 305 and the receiver 307 include appropriate circuitry to enable digital transmissions over a selected communication link. The communication link may be a wireline link (including, but not limited to, an asymmetric or symmetric digital subscriber line (DSL), an integrated digital services network (ISDN), a low speed telephone line, or a hybrid fiber coaxial network) or a wireless link (including, but not limited to, an infrared link, a radio frequency link, or a microwave link (e.g., as part of a satellite transmission network)). For example, the transmitter 305 and receiver 307 may be implemented as an appropriate wireline or wireless modem. Such a wireless modem may be implemented on a Personal Computer Memory Card International Association (PCMCIA) card that may be inserted into a computing device, such as a laptop or palmtop computer or PDA, to facilitate wireless communications. Wireline and wireless modems are well known; thus no further discussion of them will be presented except to facilitate an understanding of the present invention.

The video codec 308 is preferably an encoder and a decoder that implement the current Moving Picture Experts Group (MPEG) standard or some other video encoding/decoding standard, such as the National Television System Committee (NTC) standard, the Phase Alternate Line (PAL) standard or the Sequential Couleur Avec Memoire (SE-CAM) standard. The output of and the input to the video codec 308 is a stream of video images. The output of video codec 308 is operably coupled (e.g., directly or through other known components, such as filters, amplifiers and other signal conditioning circuits) to the video processor 321; whereas, the input to the video codec 308 is operably coupled to either the output of the image buffer 317 or the output of the image processor 315.

Figure 4:
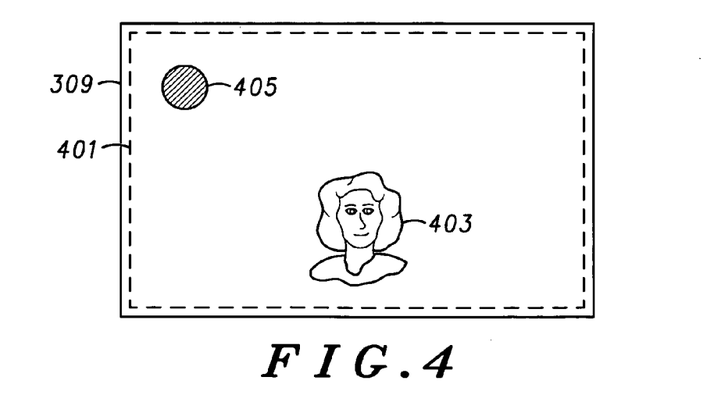
FIG. 4 illustrates a composite image presented on a display of the two-way communication device of FIG. 3 in accordance with the present invention.

Operation of the two-way communication device 300 in accordance with a preferred embodiment of the present invention can be more fully understood with reference to FIGS. 3 and 4. The camera 301 captures an image in its video capturing volume as described in detail above with respect to FIG. 1 and stores the captured image in the image buffer 317 as well as optionally providing the image to the video codec 308. The captured image preferably includes the device user or one or more portions of the user (e.g., the user's head). The location determiner 319 retrieves the captured image from the image buffer 317, determines the location of any person or portion thereof (e.g., the person's head) contained in the captured image as described in detail above, and provides the location(s) to the video processor 321. The captured image, if not provided to the video codec 308 by the image processor 315, is also retrieved from the image buffer 31 by the video codec 308. The video codec 308 encodes the captured image in accordance with known video encoding techniques and forwards the encoded image to the transmitter 305. The transmitter 305 then modulates (if necessary) and transmits the encoded image to the remote communication device in accordance with the communication protocol of the communication link between the two devices.

Upon receiving the location of the captured image from the location determiner 319, the video processor 321 instructs the abstract representation generator 323 to generate an abstract representation (e.g., an icon 405 or an audible representation) of each person or portion thereof located by the location determiner 319. If other persons or objects are also present in the image captured by the camera 301, the video processor 321 may instruct the abstract representation generator 323 to generate abstract representations of them provided that their respective locations were determined and provided to the video processor 321 by the location determiner 319. The video processor 321 then receives the abstract representation(s) from the abstract representation generator 323.

The video processor 321 also receives images from the remote communication device. Encoded video images communicated by the remote communication device are detected and demodulated (if necessary) by the receiver 307 in accordance with the communication protocol of the communication link between the two devices. The received images are provided to the video codec 308, wherein the images are decoded in accordance with known techniques and forwarded to the video processor 321. Having received the abstract representation(s) from the abstract representation generator 323 and the decoded video images from the remote device, the video processor 321 proceeds with providing appropriate instructions to the display 309 to display a composite image that includes both the abstract representation(s) and the images received from the remote device. As discussed in detail above, the abstract representation is positioned to indicate the location (actual location or a relative change in location) of the user (or a portion thereof) of the two-way communication device 300 with respect to the video capturing volume of the camera 301.

For example, when the abstract representation is an icon 405 as illustrated in FIG. 4, the video processor 321 instructs the display 309 to display both the icon 405 and the image 403 received from the remote device in a composite image 401 on the display screen. The icon 405 occupies substantially less area in the displayed image 401 than would the entire image of the device user or the portion of the user contained in the image captured by the camera 301 had the entire image of the user or portion thereof been displayed. When the abstract representation is displayed audibly instead of graphically, no display screen area is necessary to display the representation, but the audible representation may need to be displayed during breaks or gaps in the audio information received by the communication device 300 from the remote communication device so as not to interfere with the received audio. By presenting only an abstract representation of the user of the communication device 300 graphically on the display 309 or by audibly presenting such an abstract representation, the communication device 300 provides the feedback necessary to inform the user where he or she is located with respect to the video capturing volume of the camera 301, without undesirably affecting the display of the images 403 received from the remote device.

As described above, the present invention provides a video processing system for use either alone or as part of a communication device. The system provides feedback to its user as to the user's location, or the location of other persons and/or objects, with respect to the video capturing volume of the system's camera. Such feedback is necessary to enable the user to position himself or herself, objects, or others, such that he/she or they can be part of the images captured by the camera. In contrast to prior art systems that provide such feedback through a live video feed displayed on the system's display screen, the present invention uses less obtrusive abstract representations, such as graphics icons, to reduce the display screen area necessary to display the feedback information and, thereby, reduce the visual effect the feedback has on other information displayed on the system's display screen. Thus, through use of the system of the present invention, more display screen area is available for displaying other information, such as a live video feed from a remote communication device (when the above-described video system is incorporated in or operably coupled to a communication device in communication with such a remote communication device), as compared to prior art feedback approaches, without sacrificing the information necessary for the system user to know his or her whereabouts with respect to the video capturing volume of the system's camera.

Figure 5:
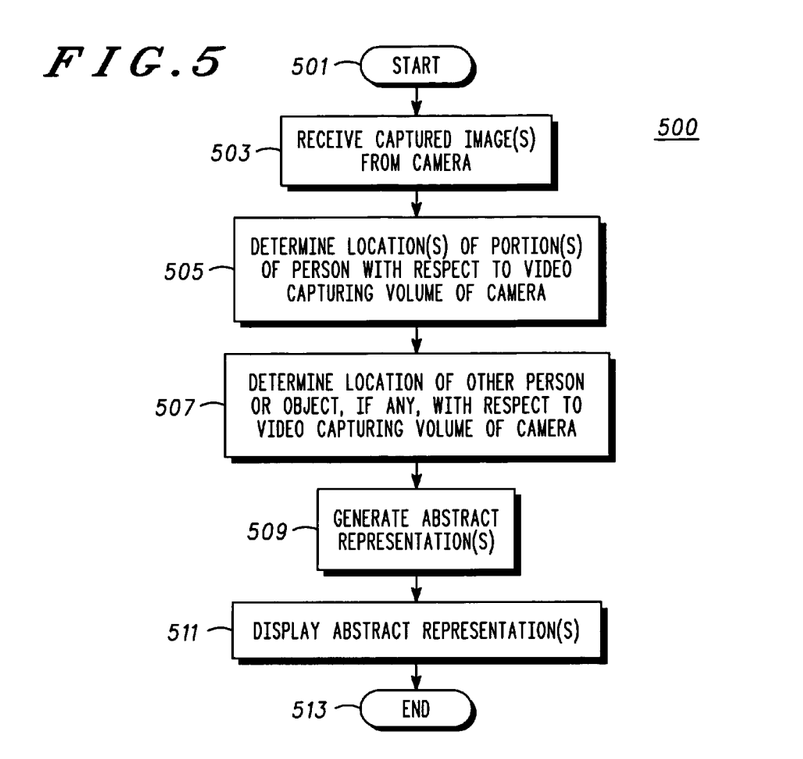
FIG. 5 is a logic flow diagram of steps executed by a video processing apparatus to indicate a location of a person with respect to a video capturing volume of a camera in accordance with the present invention.

FIG. 5 is a logic flow diagram 500 of steps executed by a video processing apparatus to indicate a location of a person with respect to a video capturing volume of a camera in accordance with the present invention. The logic flow depicted in FIG. 5 is preferably stored as operating instructions in a memory of a storage medium and is executed by one or more processing devices to cause the processing device(s) to perform at least the functions recited in the FIG. The logic flow begins (501) when the video processing apparatus receives (503) at least one captured image from a camera. The image(s) preferably include one or more portions (e.g., the head or the head and torso) of a user of the video processing apparatus. The video processing apparatus then determines (505) the location(s) of the user portion(s) with respect to the video capturing volume of the camera. The video capturing volume of the camera corresponds to be the volume that contains the captured image received from the camera. The video processing apparatus may also determine (507) the locations of other persons or objects, if any, in the captured image with respect to the video capturing volume of the camera. As discussed in detail above, each determined location may be an actual location in a single captured video frame or a relative location change over multiple captured video frames. The actual location may be one or more of position and depth, whereas the relative location change may be one or more of translation and rotation.

The video processing apparatus generates (509) an abstract representation for one or more of the persons, person portions, and/or objects detected in the captured image. The abstract representation(s) may be pre-generated and stored in memory or may be generated responsive to the determination of the location of the person, person portion, and/or object. The quantity of abstract representations generated and ultimately displayed may be less than a threshold quantity to insure that the display of the representations does not negatively impact the viewing of other video or graphics images on the display. In a preferred embodiment, an abstract representation is generated only for each person or person portion (e.g., person's head) present in the captured image received from the camera.

After each location has been determined and each abstract representation generated, the video processing apparatus displays (511) the abstract representation(s), and the logic flow ends (513). As discussed above, each abstract representation may be any representation that occupies less area when displayed than the area occupied by the original captured image represented by the abstract representation. In the preferred embodiment, each abstract representation is a graphics icon having a particular geometric shape. Alternatively, each abstract representation may be an audible representation (e.g., a tone or a pre-stored audio message) or a scaled down or miniature version of the original captured image. When multiple abstract representations are to be displayed, the abstract representations may be any combination of the aforementioned forms of representations (e.g., some icon representations and some audible representations). When displaying relative location change, the video processing apparatus may use known techniques to animate the abstract representation over several video frames. In addition, the displayed abstract representation may indicate the direction in which the apparatus user or any other abstractly represented person or object should move or be moved in order to be located substantially in a center portion of the video capturing volume of the camera. Additional display considerations are described below with respect to FIG. 6.

Figure 6:
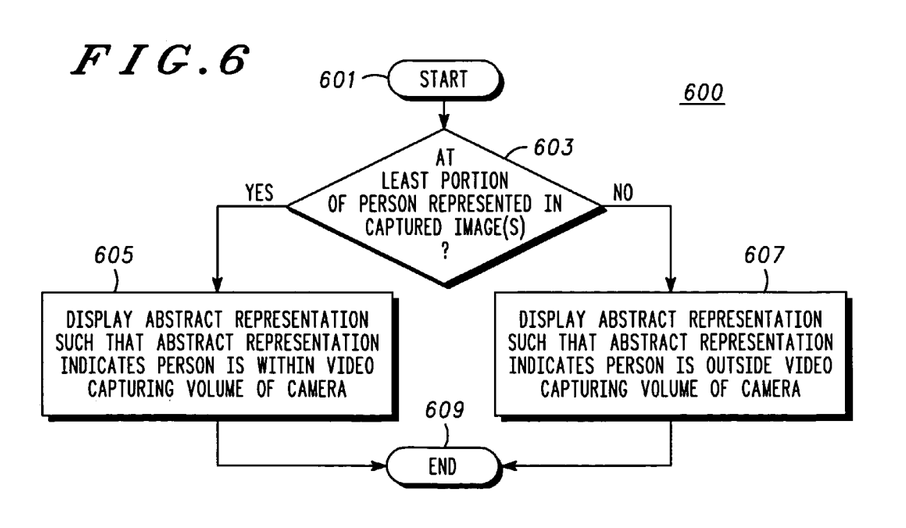
FIG. 6 is a logic flow diagram of steps executed by a video processing apparatus to display an abstract representation in accordance with a particular embodiment of the present invention.

FIG. 6 is a logic flow diagram 600 of steps executed by a video processing apparatus to display an abstract representation in accordance with a particular embodiment of the present invention. The logic flow depicted in FIG. 6 is preferably stored as operating instructions in a memory of a storage medium and is executed by one or more processing devices to cause the processing device(s) to perform at least the functions recited in the FIG. The logic flow begins (601) when the video processing apparatus determines (603) whether at least a portion of a person is represented in the captured image(s) received from the camera. Such a determination may be made by evaluating the size and shape of the visual mass contained in the captured image in accordance with known image processing techniques, and comparing the processed image with previously stored images. In the event that at least a portion of a person is represented in the captured image(s), the video processing device displays (605) an abstract representation of the person or person portion such that the abstract representation indicates that the person is within the video capturing volume of the camera, and the logic flow ends (609). That is, when at least a portion of a person is represented in the captured image(s), the video processing device displays an abstract representation as described above with respect to block 511 of FIG. 5. In the event that the person is nearing an edge of a video capturing volume of the camera, the video processing device may further visually and/or audibly display a warning to the person to inform the person that he or she is nearing the edge of the camera's video capturing volume.

On the other hand, in the event that the video processing apparatus determines that at least a portion of a person is not represented in the captured image(s) after performing known image processing techniques, the video processing device displays (607) an abstract representation of the person or person portion such that the abstract representation indicates that the person is outside the video capturing volume of the camera, and the logic flow ends (609). That is, the video processing apparatus attempts to inform the user of the video processing apparatus that he or she is outside the video capturing volume of the camera. To provide such information, the video processing apparatus may vary or animate a displayed abstract representation to indicate the user is not present in the captured image. For example, the video processing apparatus may display a blinking circle, or change the color of the icon normally displayed when the user is present in the captured image to indicate that no person is in the captured image. The user can use the information conveyed by the displayed representation to determine that he or she should reposition himself or herself in the video capturing volume of the camera.

Figure 7:
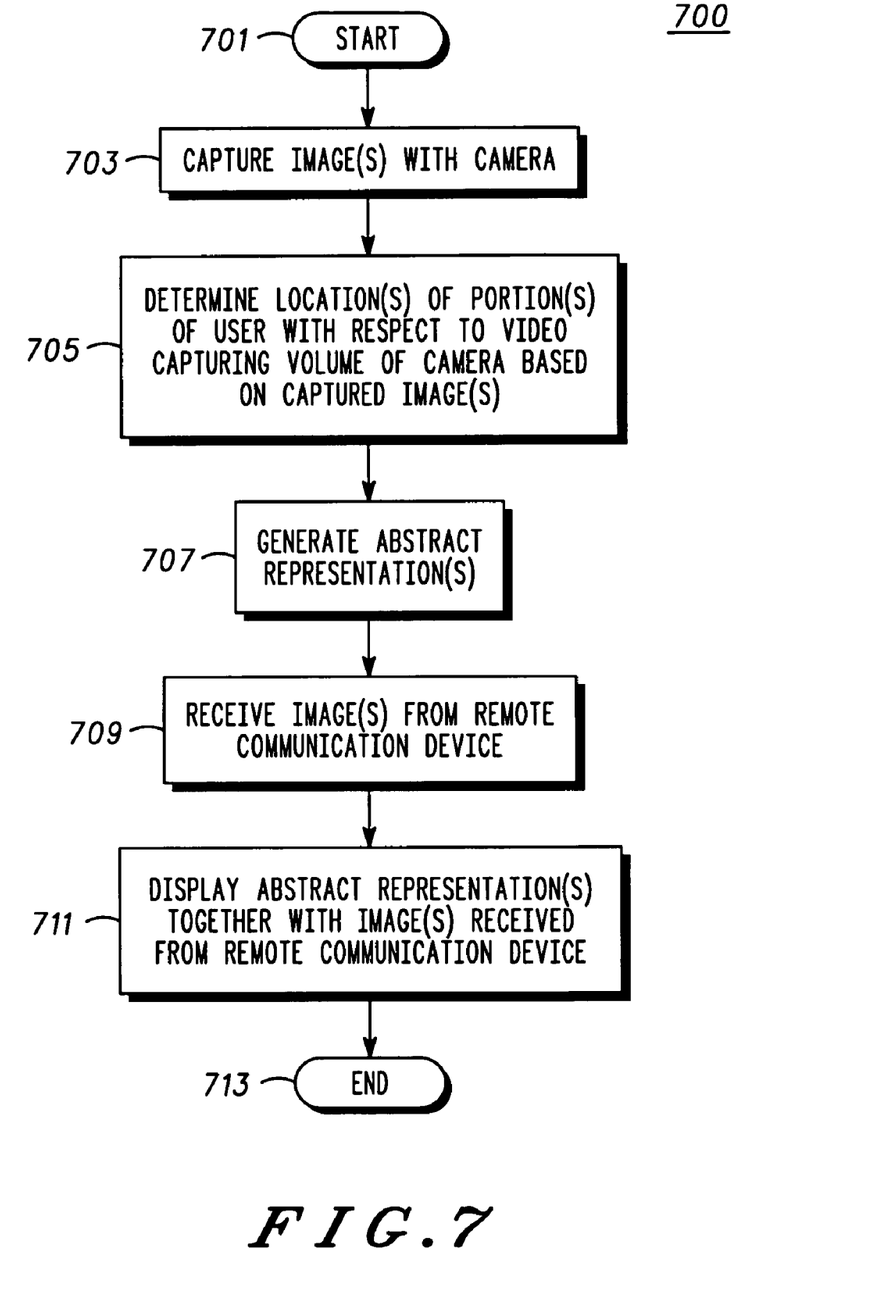
FIG. 7 is a logic flow diagram of steps executed by a two-way communication device to indicate a location of a device user with respect to a video capturing volume of the device's camera in accordance with the present invention.

FIG. 7 is a logic flow diagram 700 of steps executed by a communication device to indicate a location of a device user with respect to a video capturing volume of the device's camera in accordance with the present invention. The logic flow begins (701) when the communication device captures (703) one or more images with a camera, such as a digital camera or video recorder that includes a CMOS imaging chip. The captured images preferably include at least a portion of the communication device user. After capturing the image(s), the communication device determines (705) a location of the portion of the user captured in the image with respect to the video capturing volume of the camera. For example, if the user's head is captured by the image, the communication device determines the location of the user's head with respect to the video capturing volume of the camera. Alternatively, the communication device may determine locations of multiple portions of the user if such portions are within the captured image(s). For instance, the communication device may determine the locations of the user's head and the user's hand with respect to the video capturing volume of the camera. Determination of multiple locations may be desired when the user is making a hand gesture intended to be clearly seen by a user of a remote communication device who is currently in communication with the user.

The locations are determined using the CMOS imaging chip in the camera to detect the video center of mass of each portion of the person for which a location is to be determined and then using the results of the center of mass determinations to compute the locations. As noted above with respect to FIGS. 1 and 2, the location of each person and/or object is determined by comparing two or more successive video frames and, using known edge detection and visual optic flow techniques, calculating a location of the video center of mass for each frame, comparing the calculated center of mass locations within the image frames to determine vertical translation between frames, and averaging radius changes to determine an estimated difference from the camera to the person and/or the object. The communication device may limit the number of locations it determines to be less than a threshold number in order to limit the number of abstract representations displayed to the device user based on the locations.

Responsive to determining the location or locations, the communication device generates (707) abstract representations for each located portion of the user or any other located person or object in the captured image, subject to the aforementioned quantity limitations and any other limitations. The abstract representations are preferably icons of predetermined geometric shapes that are substantially smaller in size than the portion of the user each representation is intended to represent had such portion been displayed on the display screen. For example, a circle or dot is used to represent the device user's head. The icons may be generated in real-time or may be pre-stored in a memory of the communication device. In addition, the representation may include an arrow or vector to indicate which direction the user should move in order to be located substantially in the center of the video capturing volume of the camera. Alternatively, the abstract representations may be pre-stored audio clips indicating the locations and optionally further instructing the user which direction to move to be more centrally located within the video capturing volume of the camera.

During the time period that the communication device captures the image(s) with the camera, determines the locations and generates the abstract representations, the communication device also receives (709) a stream of video images from a remote communication device. The stream of images preferably includes scenes containing a user of the remote communication device. Thus, in a two-way audiovisual communication, the communication device captures the image or scene of the device's user with its own camera and simultaneously receives images of the remote user from the remote communication device.

Having received the images from the remote device and generated the abstract representation or representations related to the device user from the image(s) captured from its own camera, the communication device displays (711) the abstract representation(s) together with the video images received from the remote communication device, and the logic flow ends (713). In a preferred embodiment, each abstract representation (typically there will only be one for the device user's head) is overlaid onto the video images received from the remote device using know graphics overlay techniques. Since the abstract representation is small with respect to the displayed image represented by the representation (and also small with respect to the display screen size), the communication device can provide the user with feedback as to his or her location with respect to the video capturing volume of the camera without substantially negatively impacting the user's ability to view the video images transmitted by the remote communication device.

The present invention encompasses a method and apparatus for indicating a location of a person with respect to a video capturing volume of a camera. With this invention, the feedback information necessary for a user of a videophone or other communication device supporting audiovisual communications is provided in a much smaller area of the display than is such information in prior art systems. Consequently, much more area of the display screen is available to display other information (e.g., a remote video feed). The present invention uniquely combines existing image processing and graphics overlay techniques to provide video feedback without using substantial display screen area to do so. In addition, the present invention, through its use of abstract representations instead of a live video feed to perform the feedback, is adaptable for use by virtually anyone. For example, although a graphics icon is the preferred feedback element, audio may be used instead or in addition to the graphics icon to enable those with impaired vision to effectively engage in two-way audiovisual communications. Thus, the present invention not only utilizes a reduced size visual feedback element, but also optionally utilizes audio feedback, as desired, to either eliminate the effects of visual feedback altogether or facilitate use of an audiovisual communication device by a sight-impaired individual.

In the foregoing specification, the present invention has been described with reference to specific embodiments. However, one of ordinary skill in the art will appreciate that various modifications and changes may be made without departing from the spirit and scope of the present invention as set forth in the appended claims. For example, the display of the abstract representation (e.g., icon) may be enabled and disabled by the user of the communication device (e.g., using a wireless remote control device) to further reduce the impact the representation has on the display of the video images received from a remote communication device. Thus, the user of the communication device may use the display features of the present invention only as needed (as opposed to continuously) to check whether or not the user's head or other intended portion is within the video capturing volume of the camera. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

What is claimed is:

1. A method of a communication device for indicating a location of a person within a video capturing volume of a camera of the communication device, the method comprising the steps of:
   receiving a first image of the person from the camera of the communication device;
   receiving a second image from a remote device;
   determining a location of the person within the video capturing volume of the camera based on the first image;
   generating an abstract representation of the person of the first image in the form of an icon; and
   displaying the abstract representation overlaying the second image on a display of the communication device, wherein the displayed position of the abstract representation indicates the location of the person within the video capturing volume of the camera.

2. The method of claim 1, wherein the step of determining a location of the person comprises the step of determining a location of the person's head.

3. The method of claim 1, wherein the step of determining a location of the person comprises the step of determining a plurality of locations corresponding to respective portions of the person.

4. The method of claim 3, wherein the step of generating an abstract representation of the person comprises the step of generating a plurality of abstract representations, each of the plurality of abstract representations corresponding to a respective portion of the person, and wherein the step of displaying the abstract representation comprises the step of displaying the plurality of abstract representations such that the plurality abstract representations indicate the plurality of locations of the respective portions of the person within the video capturing volume of the camera.

5. The method of claim 1, further comprising the steps of:
   determining a location of at least one of another person and an object;
   generating a corresponding abstract representation of the at least one of another person and an object to produce a second abstract representation; and
   displaying the second abstract representation to the person such that the second abstract representation indicates the location of the at least one of another person and an object within the video capturing volume of the camera.

6. The method of claim 1, wherein the step of displaying the abstract representation comprises the step of animating the abstract representation over a plurality of video frames.

7. The method of claim 1, wherein the step of determining a location of the person within the video capturing volume of the camera comprises the steps of:
   determining whether at least a portion of the person is represented in the first image; and
   in the event that at least a portion of the person is represented in the first image, determining that the person is within the video capturing volume of the camera.

8. The method of claim 7, wherein the step of displaying the abstract representation comprises the step of displaying the abstract representation to the person such that the abstract representation indicates the location of the person within the video capturing volume of the camera.

9. The method of claim 7, wherein the step of displaying the abstract representation comprises the step of displaying the abstract representation to the person such that the abstract representation indicates that the person is outside the video capturing volume of the camera in the event that the at least a portion of the person is not represented in the first image.

10. A method for indicating a location of a user of a two-way communication device within video capturing volume of a camera operably coupled to the two-way communication device, the method comprising the steps of:
    capturing an image with the camera of the two-way communication device to produce a captured image, the captured image including at least a portion of the user;
    receiving a second image from a remote device;
    determining a location of the user within the video capturing volume of the camera based on the captured image;
    generating an abstract representation of the user of the captured image in the form of an icon; and
    displaying the abstract representation overlaying the second image on a display of the two-way communication device, wherein the displayed position of the abstract representation indicates the location of the user within the video capturing volume of the camera.

11. An apparatus that is operably coupleable to a camera, the apparatus comprising:
    a location determiner, operably coupled to the camera, for determining a location of a person within a video capturing volume of the camera based on a first image received from the camera, the first image including at least a portion of a person;

an abstract representation generator for generating an abstract representation of the person of the first image in the form of an icon;

a receiver for receiving a second image from a remote device; and a video processor, operably coupled to the location determiner and the abstract representation generator, for positioning the abstract representation overlaying the second image in an image to be displayed to the person, wherein the position of the abstract representation indicates the location of the person within the video capturing volume of the camera.

12. The apparatus of claim 11, further comprising:

a display, operably coupled to the video processor, for displaying the image containing the abstract representation to the person.

13. The apparatus of claim 11, further comprising a transmitter for transmitting the first image received from the camera to a remote device.

14. The apparatus of claim 11, wherein the location is an actual location of the person in the video capturing volume of the camera during a video frame processed by the camera.

15. The apparatus of claim 11, wherein the location is a relative location change within a plurality of video frames processed by the camera.

16. The apparatus of claim 15, wherein the relative location change comprises at least one of a translation and a rotation.

17. The apparatus of claim 11, wherein the location comprises at least one of a position and a depth.

18. The apparatus of claim 11, wherein the icon comprises a geometric shape.

19. The apparatus of claim 11, wherein the abstract representation further indicates a direction in which the person should move in order to be located substantially in a center portion of the video capturing volume of the camera.

20. A two-way communication device comprising:

a camera for capturing an image within a video capturing volume of the camera to produce a captured image, the captured image including at least a portion of a user of the two-way communication device;

a location determiner, operably coupled to the camera, for determining a location of the user within the video capturing volume of the camera based on the captured image;

an abstract representation generator for generating an abstract representation of the user of the captured image in the form of an icon;

a receiver for receiving an image from a second two-way communication device;

a video processor, operably coupled to the location determiner and the abstract representation generator, for arranging the abstract representation overlaying the image received from the second two-way communication device together in a composite image to be displayed to the user, wherein the position of the abstract representation indicates the location of the user within the video capturing volume of the camera;

a display, operably coupled to the video processor, for displaying the composite image to the user; and a transmitter, operably coupled to the camera, for communicating the captured image to the second two-way communication device.

* * * * *